(12) United States Patent
Yoon et al.

(10) Patent No.: US 9,495,891 B2
(45) Date of Patent: Nov. 15, 2016

(54) DISPLAY DEVICE AND METHOD OF ASSEMBLING THE SAME

(71) Applicant: Samsung Display Co., Ltd., Yongin, Gyeonggi-do (KR)

(72) Inventors: Soo-Yong Yoon, Yongin (KR); Jin-Min Chung, Yongin (KR); Hyun-Sang Park, Yongin (KR)

(73) Assignee: Samsung Display Co., Ltd., Yongin (KR)

( * ) Notice: Subject to any disclaimer, the term of this patent is extended or adjusted under 35 U.S.C. 154(b) by 234 days.

(21) Appl. No.: 13/770,830

(22) Filed: Feb. 19, 2013

(65) Prior Publication Data

US 2014/0126227 A1    May 8, 2014

(30) Foreign Application Priority Data

Nov. 5, 2012   (KR) .......................... 10-2012-0124311

(51) Int. Cl.
| | | |
|---|---|---|
| *G09F 9/302* | (2006.01) | |
| *G09F 9/30* | (2006.01) | |
| *G02F 1/1333* | (2006.01) | |
| *G09F 1/12* | (2006.01) | |

(52) U.S. Cl.
CPC ......... *G09F 9/301* (2013.01); *G02F 1/133305* (2013.01); *G02F 1/133308* (2013.01); *Y10T 29/49826* (2015.01)

(58) Field of Classification Search
CPC ............. G09F 9/301; G02F 1/133308; G02F 1/133305

USPC .......................... 313/511; 362/217.1–217.17, 362/249.01–249.19, 632–634
See application file for complete search history.

(56) References Cited

U.S. PATENT DOCUMENTS

| | | | | |
|---|---|---|---|---|
| 6,762,929 | B2 * | 7/2004 | Sawyer ................. | G06F 1/1601 248/535 |
| 7,683,541 | B2 * | 3/2010 | Sakata .................... | H04N 5/64 313/511 |
| 2011/0109596 | A1 * | 5/2011 | Yoon .................... | H01L 27/3272 345/204 |
| 2015/0062480 | A1 * | 3/2015 | Cho .................. | G02F 1/133308 349/58 |

FOREIGN PATENT DOCUMENTS

| | | |
|---|---|---|
| JP | 2009-086560 | 4/2009 |
| KR | 10-2006-0107958 | 10/2006 |
| KR | 10-2012-0029090 | 3/2012 |
| KR | 10-2012-0052766 | 5/2012 |

* cited by examiner

*Primary Examiner* — Anh Mai
*Assistant Examiner* — Nathaniel Lee
(74) *Attorney, Agent, or Firm* — Knobbe Martens Olson & Bear LLP (57) ABSTRACT

A display device and method of assembling the same are disclosed. In one aspect, a display device includes a display panel bent in a first direction and a guide unit for fastening the display panel in a bent state. The guide unit includes a first frame member bent corresponding to curvature of the display panel in the first direction and combined with an edge of the display panel in the first direction, and a second frame member combined with an edge of the display panel in a direction perpendicular to the first direction.

13 Claims, 9 Drawing Sheets

DISPLAY DEVICE AND METHOD OF ASSEMBLING THE SAME

CROSS-REFERENCE TO RELATED APPLICATIONS

This application claims priority to and the benefit of Korean Patent Application No. 10-2012-0124311 filed in the Korean Intellectual Property Office on Nov. 5, 2012, the entire contents of which are incorporated herein by reference.

BACKGROUND

1. Field of the Technology

The described technology generally relates to a display device and a method of assembling the same. More particularly, the present invention relates to a display device having a curved and flexible display surface and a method of assembling the same.

2. Description of the Related Technology

Popular types of display device include commercially available liquid crystal displays (LCDs) and organic light emitting diodes (OLEDs), which have recently attracted attention.

Unlike LCD, OLED is self-emitting and does not require an additional light source. Thus, the thickness and weight of the display can be reduced. In addition, OLED technology has other valuable characteristics such as low power consumption, high luminance and high response speed.

With the development of display technology, TV receivers can have high definition and large screen, and the movie or game industry increasingly requires stereoscopic images.

The stereoscopic effect of the images can be achieved through a flexible screen.

For example, while a flat display with a large screen size may have a limited viewing angle, it can be improved through the use of a flexible screen, and image distortion due to the viewing angle can be reduced, thus achieving more robust stereoscopic images.

SUMMARY OF CERTAIN INVENTIVE ASPECTS

One inventive aspect is a display device and a method of assembling the same having advantages of implementing a bent display panel from a flat display panel using a simple assembly.

Another aspect is a display device including a flexible display panel displaying an image and configured to bend in a first direction, and a guide unit configured to fix the display panel in a curved state, wherein the guide unit includes a first frame member bent corresponding to curvature of the display panel in the first direction and combined with an edge of the display panel in the first direction, and a second frame member combined with an edge of the display panel in a direction perpendicular to the first direction.

The first frame member and the second frame member may be combined with the edges of the display panel.

The first frame member and the second frame member may be combined with each other.

Neighboring ends of the first frame member and the second frame member may be combined with each other by a first fastening member.

The frame guide member and the second frame member may be formed of a rigid material.

The guide unit may further include a first guide member disposed between one side of the display panel and the first frame member and a second guide member disposed between one side of the display panel and the second frame member.

The first guide member and the second guide member may be formed of aluminum.

The guide unit may further include a heat dissipation sheet located on the backside of the display panel.

A cover plate may be located on the heat dissipation sheet and fastened to the display panel by a fastening part.

The fastening part includes a fastening plate for connecting the cover plate to the first frame member or the second frame member and a second fastening member for fastening at least one of the fastening plate and the cover plate to the display panel.

The heat dissipation sheet may be formed of graphite and the cover plate may be formed of aluminum.

The display panel may include an organic light emitting element.

Another embodiment provides a method of assembling a display device, which includes: bending a flat display panel in a first direction; and fastening edges of the bent display panel.

The fastening of the edge of the bent display panel may include: fastening an edge of the display panel in the first direction to a first frame member bent corresponding to curvature of the display panel; fastening an edge of the display panel in a direction perpendicular to the first direction to a second frame member in a straight form; and combining the first frame member and the second frame member using a first fastening member.

The method may further include locating a heat dissipation sheet on the backside of the display panel.

According to an embodiment, it is possible to provide a display device having a bent display panel by fastening a flat display panel to an assembly in a simple structure.

DETAILED DESCRIPTION OF CERTAIN INVENTIVE EMBODIMENTS

The disclosed technology will be described more fully hereinafter with reference to the accompanying drawings, in which embodiments are shown. As those skilled in the art would realize, the described embodiments may be modified in various different ways, all without departing from the spirit or scope of the disclosed technology.

The drawings and description are to be regarded as illustrative in nature and not restrictive. The same reference numerals designate the same or like elements throughout the specification.

In the drawings, dimensions and thicknesses of components are exaggerated, omitted or schematically illustrated for clarity and convenience of description. In addition, dimensions of constituent elements do not entirely reflect actual dimensions thereof In the whole specification, unless explicitly described to the contrary, the word "comprise" and variations such as "comprises" or "comprising", will be understood to imply the inclusion of stated elements but not the exclusion of any other elements.

Furthermore, the expression "on" or "under" may be used herein to represent the relationship of one element to another element as illustrated in the figures. It will be understood that this expression is intended to encompass different orientations of the elements in addition to the orientation depicted in the figures, namely, to encompass both "on" and "under".

Figure 1:
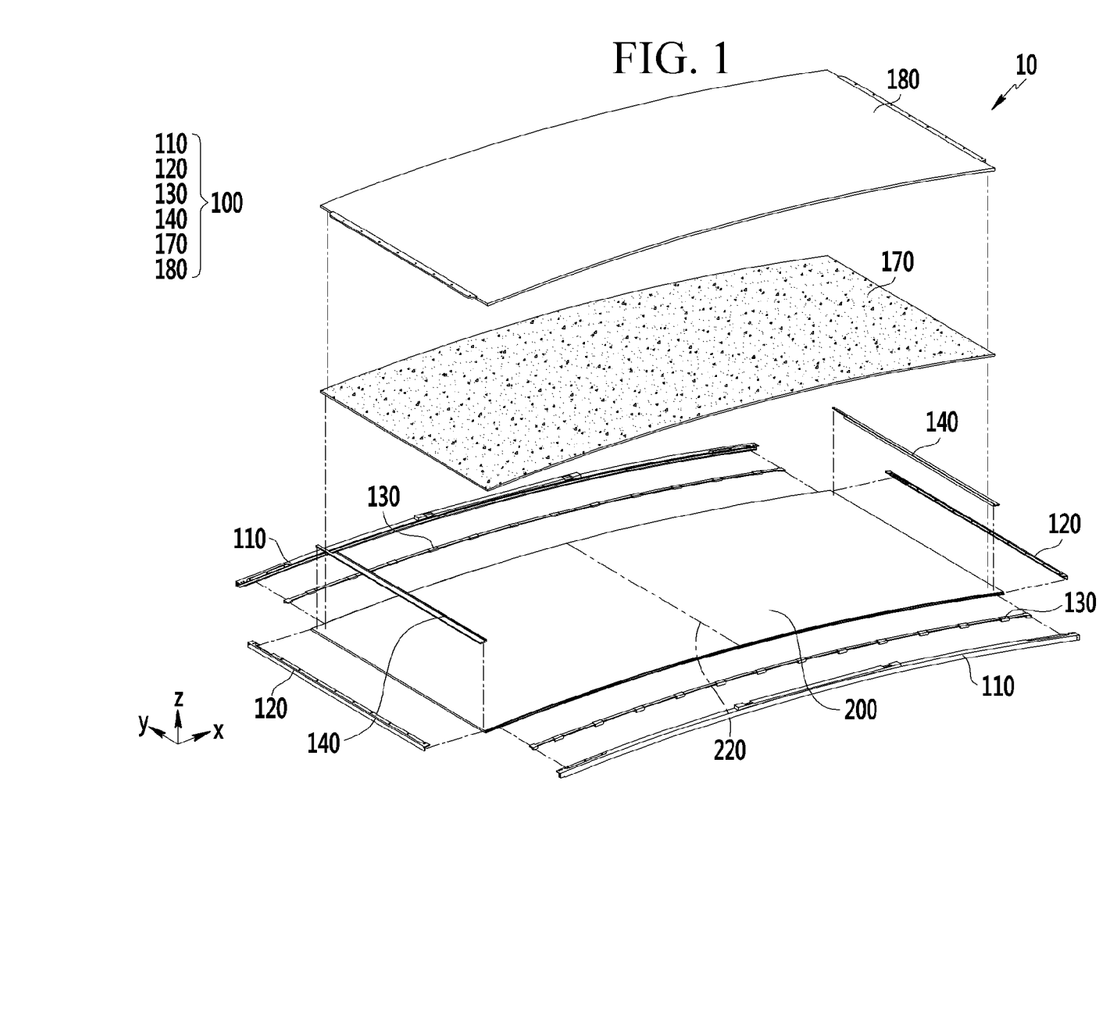
FIG. 1 is an exploded perspective view of a display device according to a first embodiment.
Figure 2:
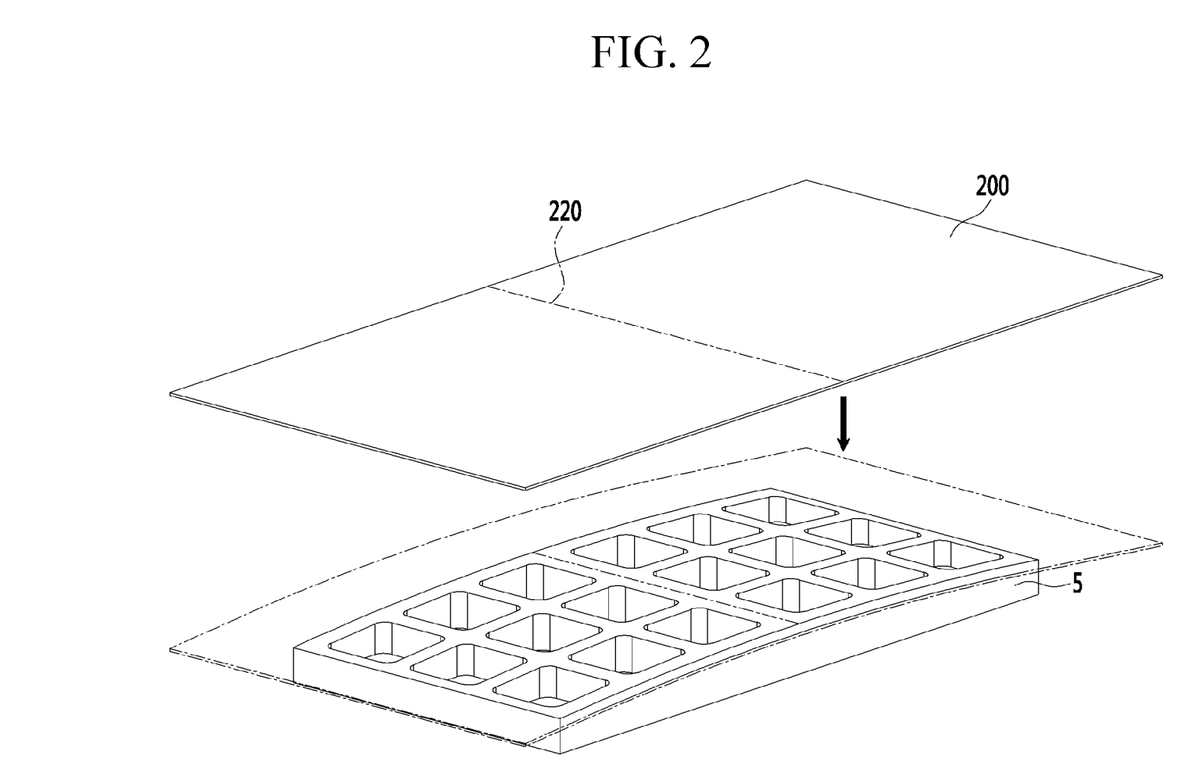
FIG. 2 illustrates a process of bending a display panel in a method of assembling a display device according to an embodiment.
Figure 3:
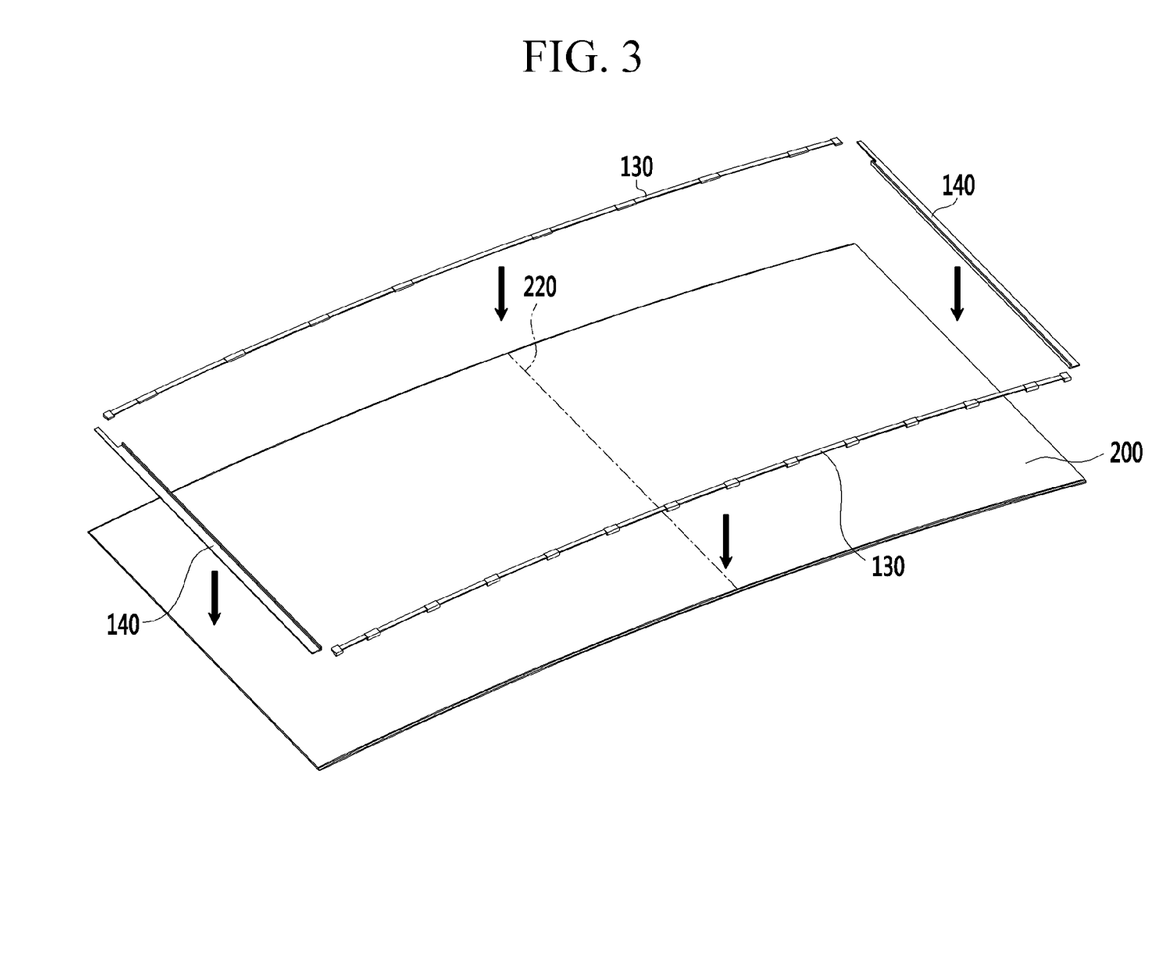
FIG. 3 illustrates a process of assembling a first guide member and a second guide member in the method of assembling a display device according to an embodiment.
Figure 4:
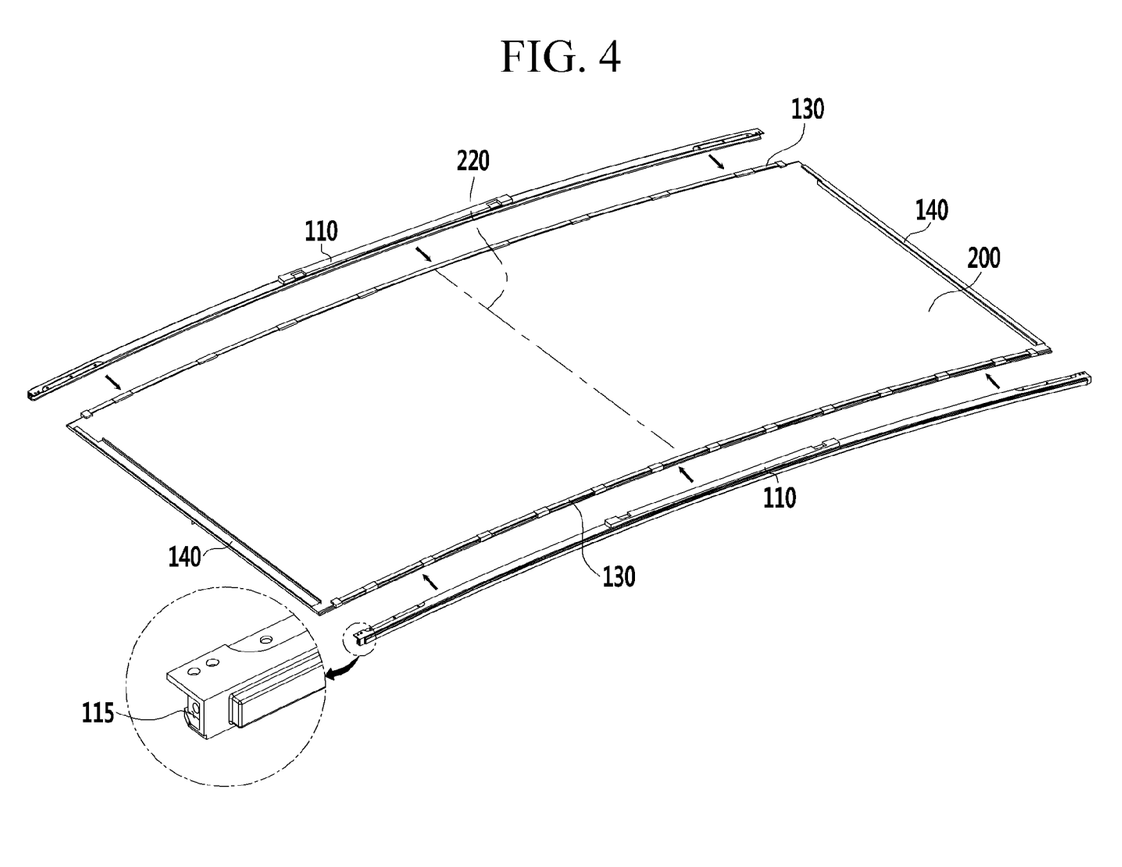
FIG. 4 illustrates a process of assembling a first frame member in the method of assembling a display device according to an embodiment.
Figure 5:
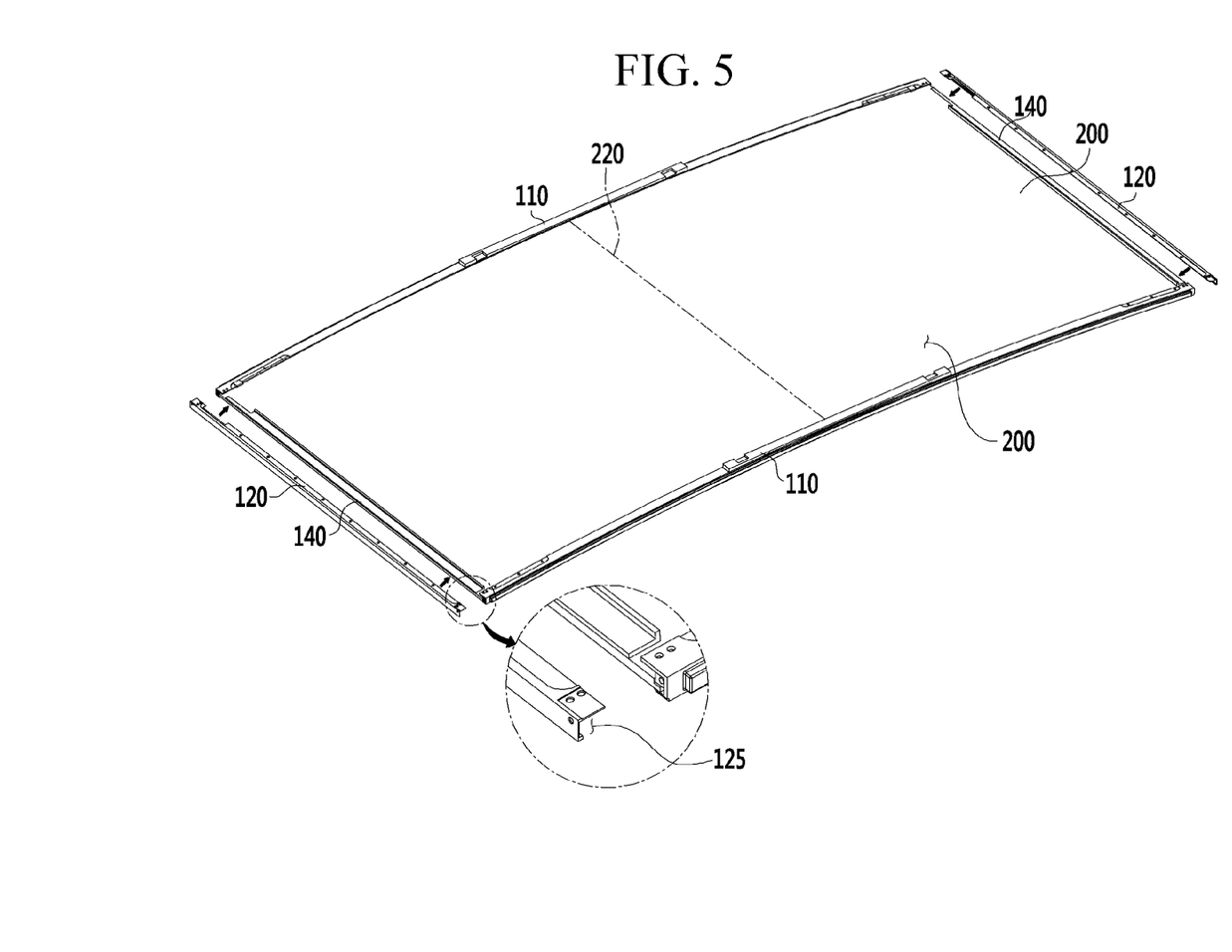
FIG. 5 illustrates a process of assembling a second frame member in the method of assembling a display device according to an embodiment.
Figure 6:
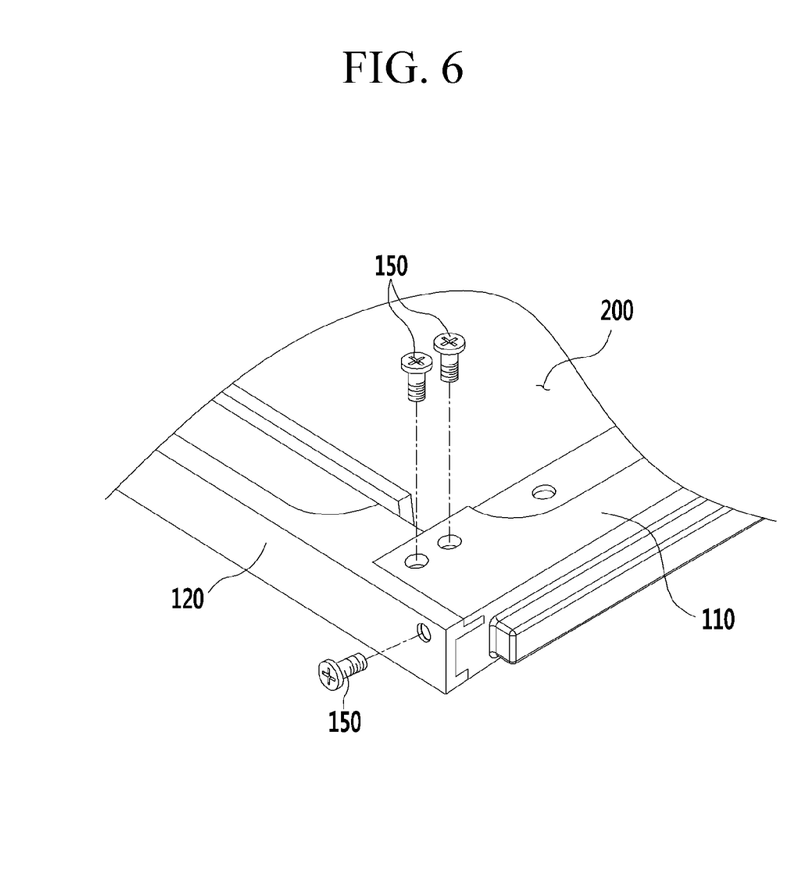
FIG. 6 illustrates a process of combining the first frame member and the second frame member through a first fastening member in the method of assembling a display device according to an embodiment.
Figure 7:
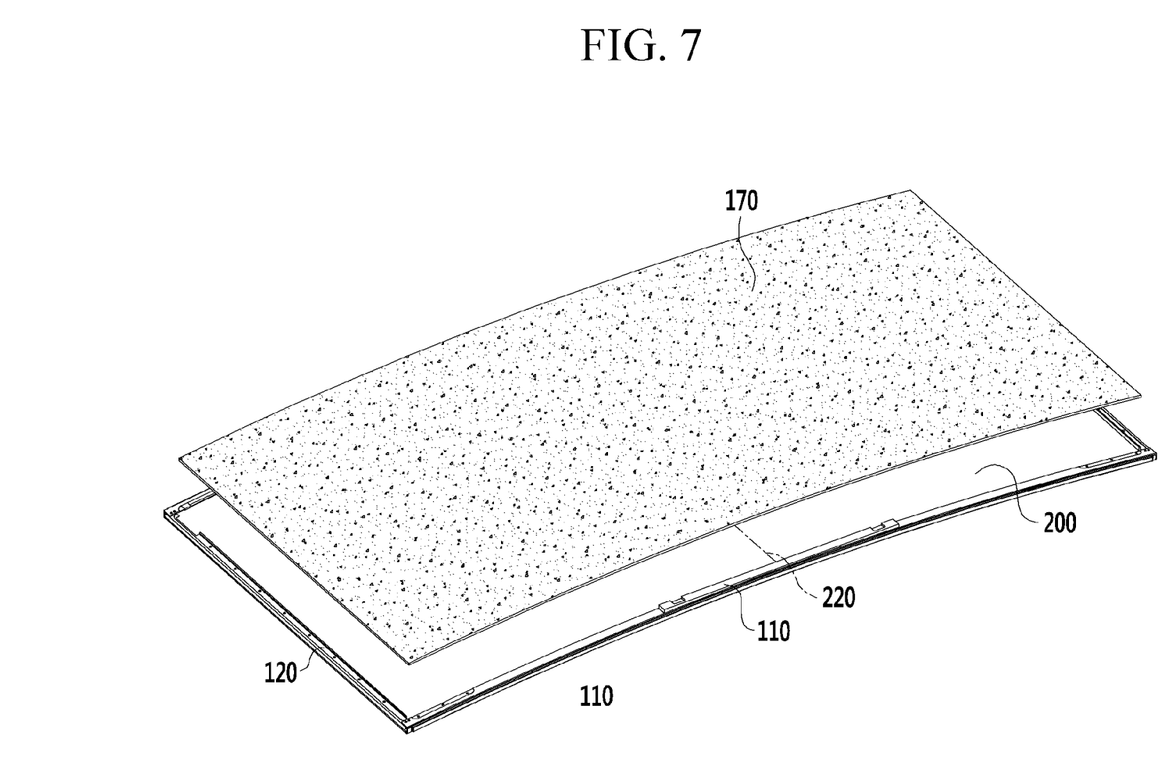
FIG. 7 illustrates a process of assembling a heat dissipation sheet in the method of assembling a display device according to an embodiment.
Figure 8:
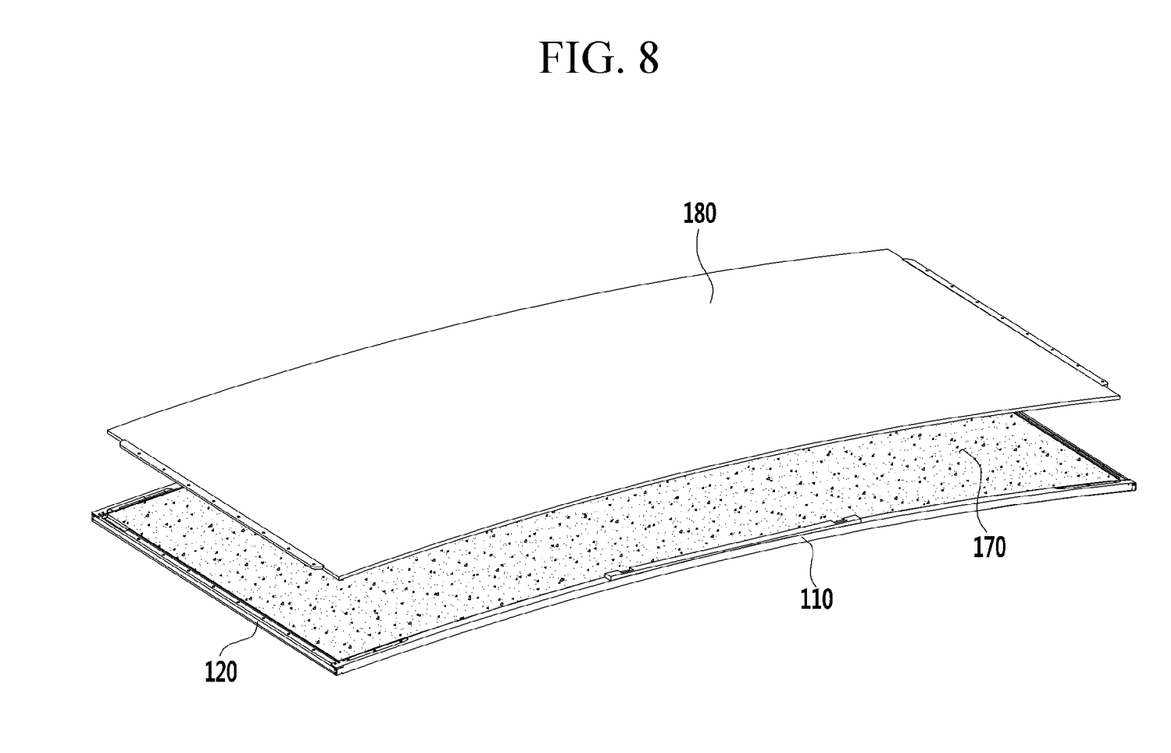
FIG. 8 illustrates a process of assembling a cover plate in the method of assembling a display device according to an embodiment.
Figure 9:
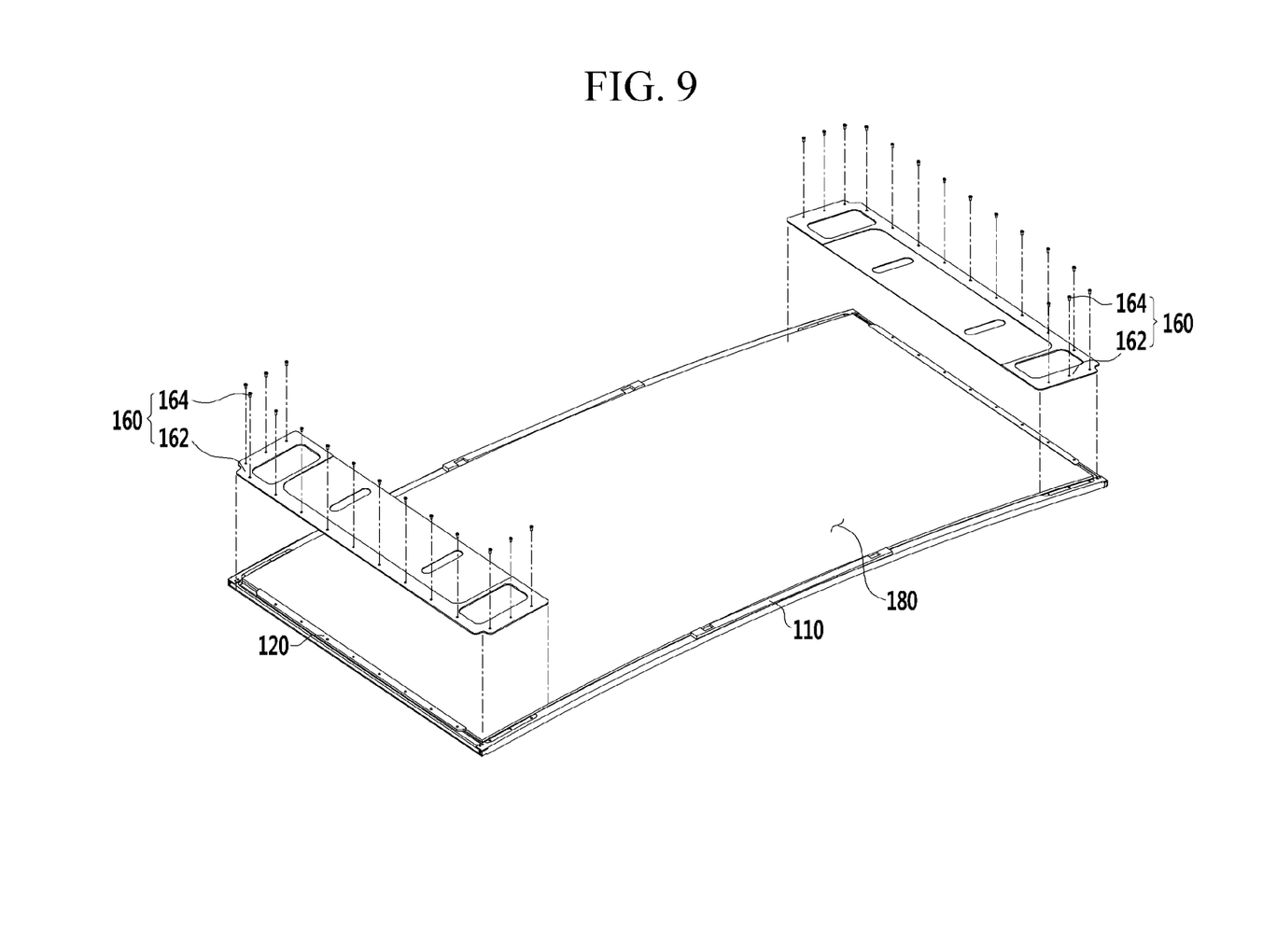
FIG. 9 illustrates a process of assembling the cover plate through a fastening part in the method of assembling a display device according to an embodiment.

FIG. 1 is an exploded perspective view of a display device according to an embodiment. FIG. 2 illustrates a process of curving a display panel in a method of assembling a display device according to an embodiment. FIG. 3 illustrates a process of assembling a first guide member and a second guide member in the method of assembling a display device according to an embodiment. FIG. 4 illustrates a process of assembling a first frame member in the method of assembling a display device according to an embodiment. FIG. 5 illustrates a process of assembling a second frame member in the method of assembling a display device according to an embodiment. FIG. 6 illustrates a process of combining the first frame member and the second frame member through a first fastening member in the method of assembling a display device according to an embodiment. FIG. 7 illustrates a process of assembling a heat dissipation sheet in the method of assembling a display device according to an embodiment. FIG. 8 illustrates a process of assembling a cover plate in the method of assembling a display device according to an embodiment. FIG. 9 illustrates a process of assembling the cover plate through a fastening part in the method of assembling a display device according to an embodiment.

A display device 10 according to an embodiment may include a variety of display apparatus such as a screen, a TV receiver, a monitor, a mobile terminal, etc.

Referring to FIG. 1, the display device 10 according to an embodiment includes a display panel 200 and a guide unit 100.

The display panel 200 displays an image. Referring to FIG. 2, the display panel 200 can be initially manufactured in a flat form.

In some embodiments, a display panel 200 may be in a rectangular shape having a pair of opposite long sides and a pair of opposite short sides.

According to an embodiment, the display panel 200 may be constructed in such a manner that display elements are interposed between a pair of rectangular substrates and sealed up.

In this case, the substrate pair may be thin glass plates and the display elements interposed between the substrates may include organic light emitting diodes.

However, the present invention is not limited thereto and the substrates may be formed of a flexible material and the display elements may include various light emitting elements.

In some embodiments, a display panel 200 may include an electrical driving circuit for implementing images and a plurality of optical sheets for acquiring distinct images.

In an embodiment, the display device 10 is constructed in such a manner that the display panel 200 is bent, as shown in FIG. 2. However, it is difficult to assemble the display panel 200 in a bent state because the display panel 200 is made of a hard material such as glass.

Therefore, the display device 10 according to an embodiment includes the guide unit 100 that is an assembly having a simple structure, and thus the display panel 200 can be bent and assembled using the guide unit 100.

Referring to FIG. 1, the guide unit 100 is an assembly for fastening the display panel 200 in a bent form. According to an embodiment, the guide unit 100 may include first and second guide members 130 and 140, first and second frame members 110 and 120, a heat dissipation sheet 170, and a cover plate 180.

Referring to FIG. 3, the first and second guide members 130 and 140 are attached the edge of the display panel 200. According to an embodiment, the first and second guide members 130 and 140 may be formed of aluminum.

Since aluminum has high ductility and thermal conductivity, the first and second guide members 130 and 140 can be easily bent to correspond to the bent display panel 200 and easily radiate heat emitted through the edge of the display panel 200.

Furthermore, the first and second guide members 130 and 140 can be located between the first and second frame members 110 and 120, which will be described below, and the display panel 200 to protect the display panel 200 when the first and second frame members 110 and 120 are attached to the display panel 200.

According to an embodiment, the first guide member 130 can be attached to an edge of the display panel 200 in the first direction.

In the specification, "first direction" refers to the direction of the long side of the display panel 200, that is, x-axis direction in FIG. 1.

According to an embodiment, the first guide member 130 can be formed in an elongated shape, bent and attached to a bent edge of the display panel 200 in the first direction, as shown in FIG. 3.

According to an embodiment, the second guide member 140 can be attached to an edge of the display panel 200 in a second direction.

In the specification, "second direction" refers to the direction of the short side of the display panel 200, that is, y-axis direction in FIG. 1, and is perpendicular to the first direction.

According to an embodiment, the second guide member 140 can be formed in an elongated form and attached to an unbent edge of the display panel 200 in the second direction, as shown in FIG. 3.

According to an embodiment, the first and second guide members 130 and 140 can be attached to the edges of the display panel 200 using a double-sided adhesive tape. However, the disclosed technology is not limited thereto and various adhesive means such as an adhesive can be used.

According to an embodiment, the first and second guide members 130 and 140 can be attached to one side of the display panel 200, more specifically, the back of the display panel 200.

However, the disclosed technology is not limited thereto and the first and second guide members 130 and 140 may be attached to both the front of the display panel 200 on which an image is displayed and the back of the display opposite to the front.

In the specification, "back" of the display panel 200 corresponds to the z-axis direction in FIG. 1.

Therefore, the display device 10 according to an embodiment can be assembled in such a manner that the backside of the display panel 200 is bent in a convex form.

Referring to FIG. 4, the first and second frame members 110 and 120 can be provided to the edges of the display panel 200 to which the first and second guide members 130 and 140 are attached.

The first and second frame members 110 and 120 are disposed at the edge of the display panel 200 and fasten the display panel 200 such that the display panel 200 maintains a bent state.

Referring to FIG. 4, the first frame member 110 can be formed in a bent shape to be attached to the bent edge of the display panel 200 in the first direction.

According to an embodiment, the first frame member 110 may include a first insertion groove 115 elongated to correspond to the edge of the display panel 200 in the first direction.

Accordingly, the cross section of the first frame member 110 can have a substantially "C" shape.

The first insertion groove 115 is formed in a bent shape to correspond to the edge of the display panel 200 in the first direction. According to an embodiment, the edge of the display panel 200 in the first direction is inserted into and engaged with the first insertion groove 115 such that the first frame member 110 can fasten the bent edge of the display panel 200 in the first direction.

According to an embodiment, the first frame member 110 can be formed of a hard material, and thus the bent shape of the display panel 200 can be easily fixed by the first frame member 110.

Referring to FIG. 5, the second frame member 120 can be attached to an edge of the display panel 200 in the second direction.

According to an embodiment, the second frame member 120 can include a second insertion groove 125 elongated to correspond to the second direction edge of the display panel 200.

Accordingly, the cross section of the second frame member 120 can have a substantially "C" shape.

The second insertion groove 125 is formed in a straight shape corresponding to the second direction edge of the display panel 200. According to an embodiment, the second direction edge of the display panel 200 is inserted into and engaged with the second insertion groove 125 such that the second frame member 120 can fasten the second direction edge of the display panel 200.

According to an embodiment, the second frame member 120 can be formed of the same material as the first frame member 110.

According to an embodiment, the first frame member 110 and the second frame member 120 can be combined with each other.

Referring to FIGS. 5 and 6, the second frame member 120 can be combined with the first frame member 110.

In this case, neighboring ends of the first and second frame members 110 120 can be combined with each other. According to an embodiment, the first and second frame members 110 and 120 can be combined with each other in such a manner that the end of the second frame member 120 is inserted into and engaged with the end of the first frame member 110.

According to an embodiment, an insertion hole and an insertion protrusion may be formed at the ends of the first frame member 110 and the second frame member 120 in order to combine the first and second frame members 110 and 120.

According to an embodiment, the end of the second frame member 120 can be fastened to the end of the first frame member 110 according to a first fastening member 150.

In this case, the first fastening member 150 can include a screw or a bolt and a plurality of first fastening members can be provided.

However, the present invention is not limited thereto and the first fastening member 150 can be composed of various fastening means.

As described above, the display device 10 according to an embodiment includes the first frame member 110 and the second frame member 120, and thus the flat display panel 200 can be assembled in a bent state and easily fastened using the first and second frame members 110 and 120.

The guide unit 100 of the display device 10 according to an embodiment includes the heat dissipation sheet 170 and the cover plate 180.

According to an embodiment, the heat dissipation sheet 170 and the cover plate 180 can be combined with the back of the fixed bent display panel 200, as shown in FIGS. 7 and 8.

The heat dissipation sheet 170 is a member for easily radiating heat and may be located on the backside of the bent display panel 200, as shown in FIG. 7.

According to an embodiment, the heat dissipation sheet 170 can be formed of graphite. However, the present invention is not limited thereto and the heat dissipation sheet 170 can be formed of various materials capable of easily radiating heat.

Otherwise, the heat dissipation sheet 170 can be formed in the form of a thin sheet and made of a flexible material.

According to an embodiment, the heat dissipation sheet 170 can be combined with the back of the display panel 200 according to the cover plate 180, which will be described below, without using an additional adhesive means. However, the disclosed technology is not limited thereto and the heat dissipation sheet 170 may be attached to the back of the display panel 200 by being configured in the form of a tape or using an additional adhesive means.

Referring to FIG. 8, the cover plate 180 attaches the heat dissipation sheet 170 to the back of the display panel 200. According to an embodiment, the cover plate 180 can be formed from a plate in a rectangular shape corresponding to the backside of the display panel 200.

According to an embodiment, the cover plate 180 can be formed of aluminum.

Accordingly, the cover plate 180 made of aluminum having high ductility can correspond to the shape of the backside of the display panel 200 and be attached to the back of the display panel 200.

Furthermore, the cover plate 180 made of aluminum having high thermal conductivity can effectively dissipate heat emitted through the backside of the display panel 200.

According to an embodiment, the cover plate 180 can be fastened to the backside of the display panel 200 according to a fastening part 160, as shown in FIG. 9.

In this case, the fastening part 160 can include a fastening plate 162 and a second fastening member 164.

Referring to FIG. 9, the fastening plate 162 has a predetermined area and can connect the cover plate 180 to the first frame member 110 or the second frame member 120 by fastening the edge of the display panel 200.

In this case, one side of the cover plate 180 can cover one side of the first frame member 110 or the second frame member 120.

Accordingly, the cover plate 180 can be stably combined with the display panel 200 and form an assembly with the first frame member 110 or the second frame member 120.

The second fastening member 164 can fasten the cover plate 180 to the display panel 200 by fastening the fastening plate 162 to one side of the cover plate 180.

The second fastening member 164 may directly combine the cover plate 180 with the display panel 200, separately from the second fastening member 164, which is not shown in the figure.

While the second fastening member 164 may include a screw or a bolt, the disclosed technology is not limited thereto and the second fastening member 164 can include various fastening means.

As described above, the display device 10 according to an embodiment includes the guide unit 100, and thus the flat display panel 200 can be assembled in a bent shape. A method of assembling the display device 10 is described in detail below using embodiments of the present disclosure.

In a method of assembling the display device 10 according to an embodiment, the flat display panel 200 may be processed into a shape bent in the first direction.

Referring to FIG. 2, the display panel 200 can be manufactured in a flat shape including thin glass substrates, as described above.

The flat display panel 200 is mounted on a jig 5 having a predetermined curvature.

Here, the display panel 200 is bent according to the weight thereof following the shape of the jig 5 located under the display panel 200.

In this case, the display panel 200 needs to have a curvature that does not damage the display panel 200 when bent. According to an embodiment, the jig 5 may include an adhesion means for assisting bending the display panel 200, and thus the display panel 200 can be easily bent.

According to an embodiment, the display panel 200 may be bent in the direction of the long side thereof, that is, the first direction. More specifically, both sides of the display panel 200 can be bent symmetrically on the basis of a center line 220 that connects the centers of the edges of the display panel 200 in the first direction.

Accordingly, the first direction edge of the display panel 200 can be bent and the second direction edge thereof is not bent.

In this case, the display panel 200 can be bent such that the backside thereof has a convex form.

The edge of the bent display panel 200 is fastened to assemble the display panel 200 in the bent state.

The process of assembling the display panel 200 in the bent state can be performed while the display panel 200 is mounted on the jig 5, as shown in FIG. 2.

The process of assembling the display panel 200 in the bent state is described below.

Referring to FIG. 3, the first guide member 130 and the second guide member 140 made of aluminum are respectively attached to the first and second direction edges of the display panel 200.

Referring to FIG. 4, the first frame member 110, which is formed of a hard material and bent corresponding to the curvature of the bent display panel 200, is combined with the first direction edge of the display panel 200.

Here, the first direction edge of the display panel 200 is inserted into the first insertion groove 115 of the first frame member 110 such that the first frame member 110 can be combined with the display panel 200.

Referring to FIG. 5, the second frame member 120 formed of a hard material is combined with the second direction edge of the display panel 200.

Here, the second direction edge of the display panel 200 is inserted into the second insertion groove 125 of the second frame member 120 such that the second frame member 120 can be combined with the display panel 200.

In this case, neighboring ends of the first frame member 110 and the second frame member 120 can be inserted into and engaged with each other.

Referring to FIG. 6, the engaged ends of the first frame member 110 and the second frame member 120 are fastened by the first fastening member 150.

In this manner, the first frame member 110 and the second frame member 120 combined with the edge of the display panel 200 are fastened to each other, fastening the bent display panel 200.

Referring to FIG. 7, the heat dissipation sheet 170 is mounted on the backside of the display panel 200. Referring to FIG. 8, the cover plate 180 in the form of a thin plate is combined with the heat dissipation sheet 170.

Since the heat dissipation sheet 170 is formed of graphite and the cover plate 180 is made of aluminum, heat emitted through the back of the display panel 200 can be efficiently dissipated.

Referring to FIG. 9, the cover plate 180 is connected with the first frame member 110 or the second frame member 120 using the fastening part 160 and stably fastened to the back of the display panel 200.

The heat dissipation sheet 170 can be easily attached to the back of the display panel 200 according to the cover plate 180 fastened to the back of the display panel 200 through the fastening part 160.

As described above, the display device 10 according to an embodiment can be easily assembled in a bent form through a simple assembling process using the guide unit 100 having a simple structure.

The above embodiments are presented for illustrative purposes only, and are not intended to define meanings or limit the scope of the present invention as set forth in the following claims. Those skilled in the art will understand that various modifications and equivalent embodiments of the present invention are possible without departing from the spirit and scope of the present invention defined by the appended claims.

What is claimed is:
1. A display device, comprising
    a display panel configured to display an image and configured to bend in a convex form in a first direction; and a guide unit configured to fix the display panel in a curved state,
wherein the guide unit comprises
a first frame member configured to bend corresponding to curvature of the display panel in the first direction extended along the first direction, and combined with an edge of the display panel in the first direction; and
a second frame member extended along a direction perpendicular to the first direction and combined with an edge of the display panel in a direction perpendicular to the first direction,
a first guide member formed in an elongated shape, bent, and disposed between one side of the display panel and the first frame member,
a second guide member formed in an elongated form and disposed between one side of the display panel and the second frame member, and
wherein the guide unit is formed of a hard material.

2. The display device of claim 1, wherein the first frame member and the second frame member are combined with the edges of the display panel.

3. The display device of claim 1, wherein the first frame member and the second frame member are combined with each other.

4. The display device of claim 3, wherein neighboring ends of the first frame member and the second frame member are combined with each other by a first fastening member.

5. The display device of claim 1, wherein the first frame member and the second frame member are formed of a rigid material.

6. The display device of claim 1, wherein the first guide member and the second guide member are formed of aluminum.

7. The display device of claim 1, wherein the guide unit further comprises a heat dissipation sheet located on a backside of the display panel.

8. The display device of claim 7, wherein a cover plate is located on the heat dissipation sheet and configured to be fixed to the display panel by a fastening part.

9. The display device of claim 8, wherein the fastening part comprises:
a fastening plate configured to connect the cover plate to the first frame member or the second frame member; and
a second fastening member configured to fasten at least one of the fastening plate and the cover plate to the display panel.

10. The display device of claim 8, wherein the heat dissipation sheet is formed of graphite and the cover plate is formed of aluminum.

11. The display device of claim 1, wherein the display panel includes an organic light emitting element.

12. A method of assembling a display device, comprising:
bending a flat display panel in a convex form in a first direction; and
fastening edges of the bent display panel, wherein the fastening of the edge of the bent display panel comprises:
fastening an edge of the display panel in the first direction to a first guiding member and a first frame member, wherein the first guiding member and the first frame member are configured to bend corresponding to curvature of the display panel extended along the first direction;
fastening an edge of the display panel in a direction perpendicular to the first direction to a second guiding member and a second frame member in a straight form and extended along a direction perpendicular to the first direction; and
combining the first frame member and the second frame member using a first fastening member; and
fixing the display panel permanently in a curved state, wherein the assembled display device is substantially inflexible.

13. The method of claim 12, further comprising locating a heat dissipation sheet on a backside of the display panel.

* * * * *